United States Patent
Ayadat

(10) Patent No.: US 12,448,148 B1
(45) Date of Patent: Oct. 21, 2025

(54) EMERGENCY LANDING SYSTEM FOR AIRCRAFTS

(71) Applicant: PRINCE MOHAMMAD BIN FAHD UNIVERSITY, Dhahran (SA)

(72) Inventor: Tahar Ayadat, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/242,550

(22) Filed: Jun. 18, 2025

(51) Int. Cl.
    *B64F 1/02* (2006.01)
    *A62C 3/08* (2006.01)

(52) U.S. Cl.
    CPC .......... *B64F 1/0297* (2020.01); *B64F 1/025* (2013.01); *A62C 3/08* (2013.01)

(58) Field of Classification Search
    CPC .......... B64F 1/10; B64F 1/025; B64F 1/0297; B64F 1/0299
    See application file for complete search history.

(56) References Cited

U.S. PATENT DOCUMENTS

| | | | |
|---|---|---|---|
| 6,394,391 B1 * | 5/2002 | Lo .............................. | B64F 1/02 244/116 |
| 2008/0308673 A1 * | 12/2008 | Liu ........................ | B64F 1/025 244/110 R |
| 2012/0158221 A1 | 6/2012 | Al Fadhli | |
| 2017/0107001 A1 * | 4/2017 | Barnes ................. | B64F 1/0297 |
| 2019/0039731 A1 * | 2/2019 | Marcath ................. | B64U 80/25 |
| 2019/0077520 A1 * | 3/2019 | Rosenberg .............. | B64F 1/228 |
| 2021/0171189 A1 * | 6/2021 | Mu ........................... | B64C 3/32 |
| 2022/0055769 A1 * | 2/2022 | Oujamaa ................. | B64F 1/227 |

FOREIGN PATENT DOCUMENTS

| | | | | |
|---|---|---|---|---|
| CN | 206813333 U | | 12/2017 | |
| CN | 114435615 B | | 1/2024 | |
| WO | WO-2023208366 A1 | * | 11/2023 | ............... B64F 1/10 |

OTHER PUBLICATIONS

Yisak Debele, et al., "Vision-Guided Tracking and Emergency Landing for UAVs on Moving Targets", Drones 2024, vol. 8, Issue 5, 182, 28 pages.

* cited by examiner

*Primary Examiner* — Richard G Davis
(74) *Attorney, Agent, or Firm* — Oblon, McClelland, Maier &Neustadt, L.L.P.

(57) ABSTRACT

An emergency aircraft landing system includes a mobile platform having a flat top surface configured to receive an aircraft landing without deployed landing gear, a plurality of wheels connected to the mobile platform by a plurality of axles mounted to a frame of the mobile platform, a propulsion system secured to the frame of the mobile platform configured to accelerate the mobile platform to a speed, and a securing mechanism configured to activate upon contact with an aircraft and secure the aircraft to the mobile platform during deceleration. Further, a method for emergency landing of an aircraft includes positioning the mobile platform at a position on a runway, accelerating the mobile platform to a speed, receiving the aircraft on the top surface, activating a securing mechanism to affix the aircraft to the mobile platform, and decelerating the combined mobile platform and aircraft.

16 Claims, 10 Drawing Sheets

EMERGENCY LANDING SYSTEM FOR AIRCRAFTS

BACKGROUND

Technical Field

The present disclosure relates to emergency aviation safety systems, and more particularly relates to an emergency aircraft landing system incorporating a mobile platform configured to intercept and support aircraft during emergency landings.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly or impliedly admitted as prior art against the present invention.

In recent decades, global air traffic has experienced significant growth across both civil and military aviation sectors, resulting in increased reliance on aircraft for passenger, cargo, surveillance, and defense operations. In parallel with this growth, the demand for advanced safety mechanisms during various phases of flight, particularly take-off and landing, has intensified. Among the systems critical to operational safety, retractable landing gear assemblies represent an essential subsystem that provides safe ground interface during taxiing, take-off roll, and touchdown.

Contemporary aircraft landing gear systems are configured with multiple interdependent mechanical, hydraulic, and electronic subsystems, including actuators, struts, downlock sensors, control valves, uplock mechanisms, and gear bays. The aforementioned components operate in a coordinated manner to provide controlled deployment and retraction of a plurality of wheels positioned on an underside of the aircraft. While ongoing advances in fault-tolerant design, materials engineering, and sensor integration have improved the reliability of such systems, landing gear failure events continue to be reported across various aircraft classes, including narrow-body and wide-body commercial jets, military fighter aircraft, turboprops, and unmanned aerial vehicles (UAVs). Failures in landing gear deployment may result from a wide spectrum of root causes, such as hydraulic fluid leakage, actuator piston seizure, uplock actuator jamming, gear door obstruction, power supply disruption, or data misreads from position sensors and avionics software anomalies. In addition, foreign object debris (FOD) ingestion and structural fatigue within mechanical linkages or hydraulic seals may contribute to landing gear malfunctions. As such, affected aircraft may be forced to perform an emergency landing without deploying a landing gear thereof. Emergency landing events pose a severe risk to aircraft structural integrity, passenger and crew safety, and airport runway infrastructure.

A gear-up landing inherently involves uncontrolled frictional engagement between the aircraft fuselage and the runway surface, resulting in rapid deceleration, high shear loading on structural components, and elevated risk of fire due to metal-on-asphalt friction and potential rupture of fuel lines. The absence of shock absorption, provided by the struts and tires of the landing gear, leads to unmitigated vertical impact loads that propagate through the airframe, increasing the likelihood of hull deformation, detachment of engine nacelles, and cabin depressurization. In addition, gear-up landings may result in secondary hazards including fuel spillage, hydraulic fluid ignition, and the obstruction of active runways, which compromises subsequent flight operations and emergency evacuation protocols.

Conventional mitigation strategies currently employed in response to such events are primarily reactive in nature and include the deployment of foam blankets along portions of the runway, pre-positioning of fire suppression and rescue crews, and issuing procedural advisories to flight crew for deceleration via aerodynamic braking and reverse thrust where feasible. However, conventional measures do not offer any mechanical infrastructure to receive or stabilize the aircraft during touchdown. Further, the current solutions may not provide directional guidance and automated deceleration assistance. Moreover, adverse weather conditions, such as rainfall, low visibility, and crosswind exposure, increase risks associated with gear-up landings by decreasing pilot control authority and increasing the likelihood of aircraft misalignment upon touchdown. Furthermore, emergency landings without landing gear may compromise the integrity of avionics bays, resulting in extended downtime for repairs, increased maintenance costs, and operational losses due to aircraft unavailability. For defense and commercial operators alike, the inability to safely recover high-value aerial assets under gear-failure conditions presents an unresolved vulnerability in airfield safety systems.

In view of the foregoing drawbacks and limitations associated with present solutions for emergency aircraft landings, there exists a requirement in the field of aviation safety and aircraft recovery systems for a reliable and adaptable solution that may provide controlled and damage-minimized landing of aircraft when conventional landing gear systems malfunction. Accordingly, one object of the present disclosure is to provide an emergency aircraft landing system that may circumvent the drawbacks and limitations of present systems known in the art.

SUMMARY

In an exemplary embodiment, an emergency aircraft landing system is described. The emergency aircraft landing system includes a mobile platform having a flat top surface configured to receive an aircraft landing without deployed landing gear, a plurality of wheels connected to the mobile platform by a plurality of axles mounted to a frame of the mobile platform, a propulsion system secured to the frame of the mobile platform configured to accelerate the mobile platform to a speed, and a securing mechanism configured to activate upon contact with the aircraft and secure the aircraft to the mobile platform during deceleration.

In some embodiments, the mobile platform has a long dimension 'x' and a short dimension 'y', where the plurality of wheels has an axis of rotation perpendicular to the long dimension 'x'.

In some embodiments, the plurality of wheels includes tires having a circumferential groove tread pattern and fusible plugs disposed on an inside of the wheels, configured to melt at a predetermined temperature to prevent wheel explosion.

In some embodiments, the propulsion system includes at least one jet engine, where the at least one jet engine is mounted to the frame of the mobile platform without extending above the flat top surface of the mobile platform.

In some embodiments, the securing mechanism includes a magnetic or clamping system configured to be activated during a landing and a plurality of hydraulically extendable projections.

In some embodiments, the emergency aircraft landing system further includes a heavy duty suspension system, secured to the frame of the mobile platform, where the heavy duty suspension system includes multi-stage shock absorbers, configured to reduce impact loads during landing.

In some embodiments, the emergency aircraft landing system further includes one or more guidance sensors arranged in a linear array along a longitudinal center and perimeter of the flat top surface of the mobile platform, where the guidance sensors include at least one of a radar sensor, an optical alignment marker, a laser position indicator, a LIDAR sensor, an infrared sensor, and a radio frequency identification (RFID) marker. Further, the guidance sensors are physically mounted on recessed brackets secured to the flat top surface of the mobile platform, electrically connected to a central control unit via shielded wiring harnesses embedded within the mobile platform, and configured to transmit positional data to guide the emergency aircraft landing system during landing.

In some embodiments, the emergency aircraft landing system further includes a compressed gas fire suppression system having one or more suppression storage tanks disposed beneath the mobile platform.

In another exemplary embodiment, a method for emergency landing of an aircraft experiencing landing gear malfunction is described. The method includes positioning the above-described mobile platform at a position on a runway, accelerating the mobile platform to a speed, receiving the aircraft on the flat top surface of the mobile platform, activating the securing mechanism to affix the aircraft to the mobile platform, and decelerating the combined mobile platform and aircraft.

In some embodiments, the method further includes communicating speed and position data between the mobile platform and the aircraft to facilitate synchronized movement during landing.

In some embodiments, the aircraft lands on the moving mobile platform in an inelastic collision, and the combined aircraft and mobile platform are gradually decelerated.

In some embodiments, activating the securing mechanism includes engaging an electromagnetic system to create an initial bond between the aircraft and the mobile platform, activating mechanical clamps to provide secondary securing of the aircraft, and extending a plurality of hydraulically extendable projections.

In some embodiments, the method further includes maintaining an aircraft's landing gear in a retracted position during the landing, where the landing gear in the retracted position is configured to reduces the risk of friction induced fires during emergency landing and minimize potential structural damage that leads to passenger injury.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1A:
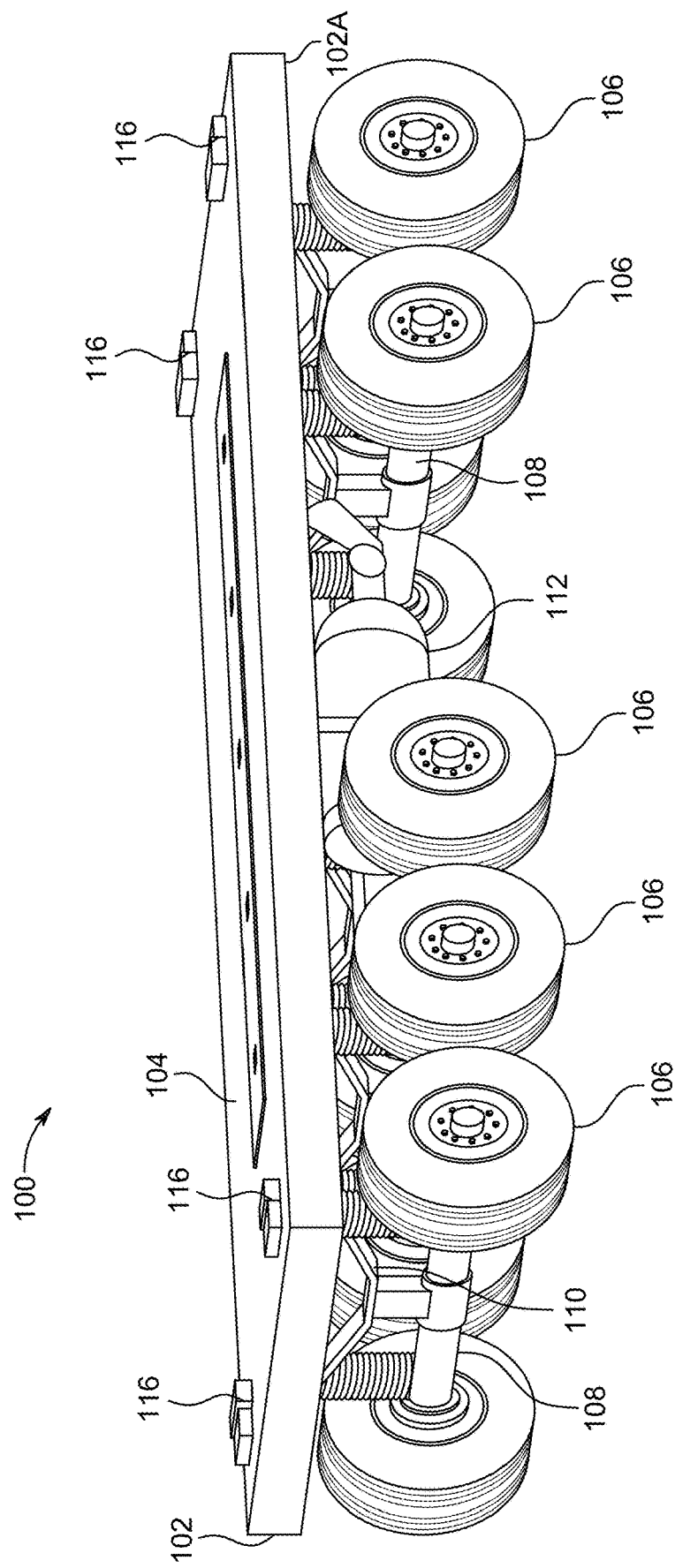
FIG. 1A is a schematic perspective view of an emergency aircraft landing system configured to receive an aircraft without deployed landing gear, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed at an emergency aircraft landing system configured to provide safe landings for aircraft experiencing landing gear malfunctions and failures. In emergency situations where conventional runway operations are compromised, the disclosed system is configured to provide a mobile solution capable of rapidly deploying and aligning with an incoming aircraft to facilitate a controlled landing. The system includes a reinforced mobile platform with a flat top surface configured to receive and support an aircraft during touchdown. Further, the system includes an integrated propulsion mechanism to match an approach speed of the aircraft, a plurality of specialized wheels for high-load maneuverability, a securing mechanism to stabilize the aircraft upon contact, and embedded guidance sensors for precise alignment. Additional features such as a fire suppression system, heavy-duty suspension, and fusible safety plugs are incorporated to mitigate post-landing hazards. The present disclosure is aimed at addressing critical safety gaps in aviation operations by providing a technically sound and deployable alternative to conventional emergency landing procedures.

For the purposes of the present disclosure, the term "aircraft" is intended to broadly encompass a wide spectrum of aerial vehicles capable of flight, including but not limited to fixed-wing airplanes, rotorcraft (such as helicopters and gyrocopters), tiltrotor and vertical take-off and landing (VTOL) platforms, unmanned aerial vehicles (UAVs or drones), military fighter and surveillance aircraft, cargo carriers, and commercial airliners of various sizes and propulsion classes. The emergency aircraft landing system may also be applicable to hybrid air vehicles, gliders, and experimental aerospace vehicles operating at low-altitude flight levels during test or deployment missions. The aforementioned aircraft may differ significantly in terms of mass, undercarriage geometry, approach speeds, and fuselage configurations. Therefore, the disclosed emergency aircraft landing system is engineered with modularity, structural adaptability, and sensor integration capabilities to accommodate the aforesaid broad range of aircraft profiles. The emergency aircraft landing system is particularly suited for deployment in scenarios involving distressed and malfunctioning aircraft where traditional landing gear is inoperative. Hence, the system as disclosed herein may provide safe recovery across a diverse range of aviation applications including, but not limited to, military, commercial, humanitarian, and exploratory.

Referring to FIG. 1A, illustrated is a schematic perspective view of an emergency aircraft landing system 100, according to certain embodiments. In particular, FIG. 1A illustrates a schematic overview of a plurality of components included in the emergency aircraft landing system 100. Further, the emergency aircraft landing system 100 may be interchangeably referred to as the "system 100" hereinafter for the sake of brevity in explanation. In some embodiments, the system 100 includes a mobile platform 102 having a flat top surface 104 configured to receive an aircraft landing without deployed landing gear. In particular, the aircraft refers to any aerial vehicle with malfunctioning on-board landing gear. The flat top surface 104 is dimensioned and structurally engineered to safely accommodate a variety of impact loads and weight distribution of commercial or defense-grade aircraft during high-speed emergency landings. The flat top surface 104 may be constructed from high-strength, aircraft-grade aluminum alloys and hybrid composite materials, optionally treated with anti-abrasion coatings to improve aircraft stability during touchdown. In addition, reinforcing ribs, internal cross-bracing, and energy-dissipating layers may be embedded beneath a bottom surface 102A of the mobile platform 102 in order to augment load transfer and absorb high impact energies associated with emergency aircraft landings.

In some embodiments, the system 100 includes a plurality of wheels 106 connected to the mobile platform 102 by a plurality of axles 108 mounted to a frame 110 of the mobile platform 102. In other words, the mobile platform 102 is supported by the plurality of wheels 106 that are mounted via the plurality of axles 108 to the frame 110 of the mobile platform 102. In one implementation of the present disclosure, the plurality of axles 108 are spaced strategically along a longitudinal axis of the frame 110 and are designed to distribute both static and dynamic loads during rapid acceleration, aircraft interception, and subsequent deceleration events, associated with emergency landing of aircraft. The plurality of wheels 106 and the plurality of axles 108 may be reinforced using high-strength steel alloys or carbon fiber composites for improved fatigue life and durability. In some embodiments (described in subsequent figures), the plurality of axles 108 may include heavy-duty, multi-stage suspension systems to mitigate vertical shock transmission, preserving both platform integrity and aircraft airframe safety during touchdown on uneven terrain or dynamic rollout.

Figure 1B:
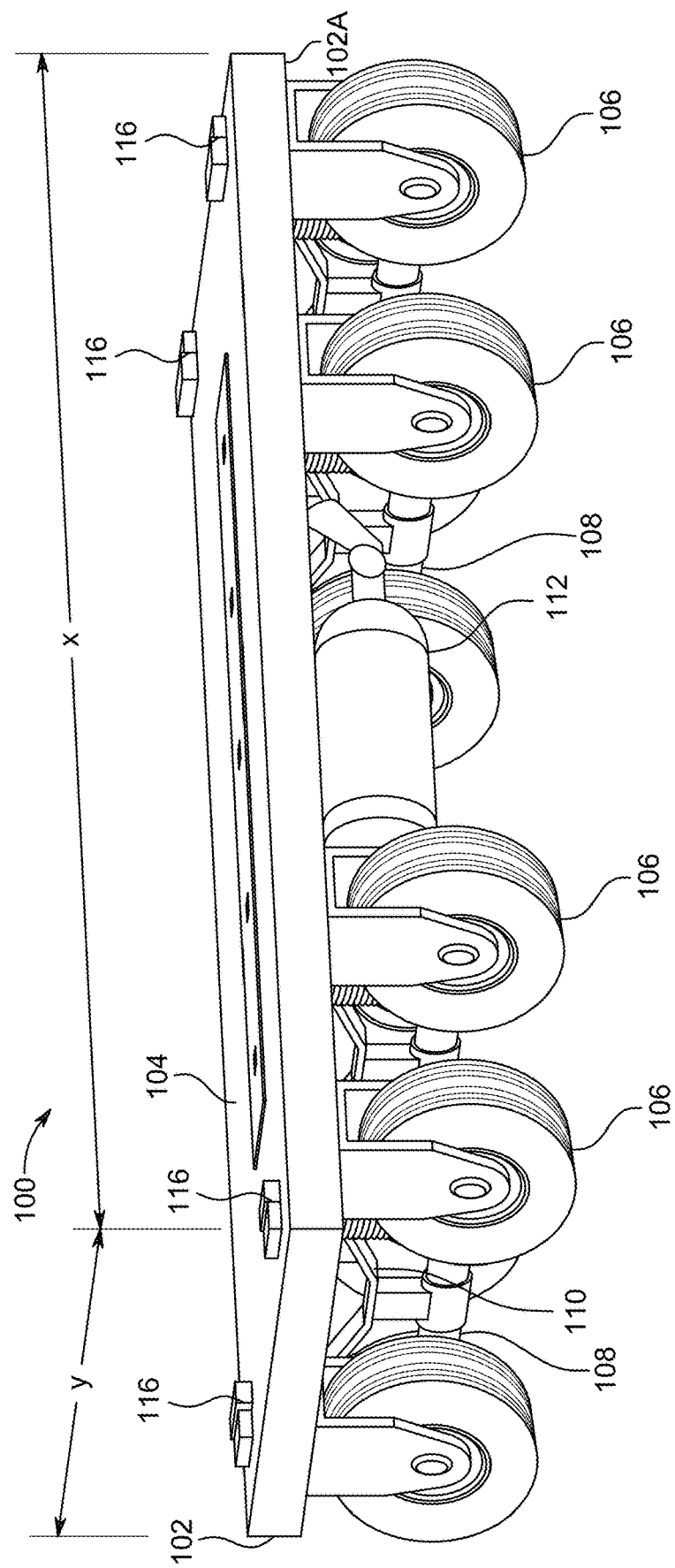
FIG. 1B is a schematic perspective view of the emergency aircraft landing system configured for lateral movement thereof along a short dimension, with a plurality of wheels positioned sideways, according to certain embodiments.

Referring to FIG. 1B, in an alternative embodiment, the emergency aircraft landing system 100 is configured with a specialized wheel orientation that enables the mobile platform 102 to move sideways rather than along its length. The mobile platform 102 has a long dimension 'x' and a short dimension 'y', where the platform's movement direction is along the short dimension 'y' during landing operations.

In this embodiment, the plurality of wheels 106 are arranged with their axes of rotation parallel to the long dimension 'x' of the mobile platform 102. This orientation is rotated 90 degrees compared to conventional vehicle wheels, which typically have rotation axes perpendicular to a vehicle's direction of travel. Specifically, the wheels 106 are mounted in pairs at each corner of the mobile platform 102, with two wheels positioned on a single axle at each of the four corners, for a total of eight wheels. Each wheel's rotation axis runs parallel to the platform's long dimension 'x', causing the mobile platform 102 to move along its short dimension 'y' when the wheels rotate.

This specialized wheel configuration enables the mobile platform 102 to travel sideways (perpendicular to its long dimension) during approach and landing operations. When the propulsion system 112 accelerates the mobile platform 102, the platform moves sideways with its long edge oriented toward the approaching aircraft. This orientation allows the platform to present its maximum dimension (the long dimension 'x') as the landing surface for the aircraft, providing a wider target area for emergency landings.

The securing mechanism 116 and guidance sensors 206 are correspondingly arranged to accommodate this sideways movement orientation of the mobile platform 102. The propulsion system 112 is configured to provide thrust in the direction of the platform's short dimension 'y', and the control systems are calibrated to manage the unique dynamics of sideways movement.

This sideways movement capability may be particularly advantageous in scenarios where runway width constraints exist, as the platform can be deployed with its narrow dimension aligned with the runway while still presenting its maximum dimension to the approaching aircraft.

The axles in FIG. 1B can be oriented transversed to what is shown.

In some embodiments, the system 100 includes a propulsion system 112 secured to the frame 110 of the mobile platform 102 and configured to accelerate the mobile platform 102 to a speed. In particular, the propulsion system 112 includes at least one jet engine 114 (FIG. 2A), where the at least one jet engine 114 is mounted to the frame 110. Further, in conjunction with the propulsion system 112, the system 100 further includes a securing mechanism 116 configured to activate upon contact with the aircraft and secure the aircraft to the mobile platform 102 during deceleration.

Figure 2A:
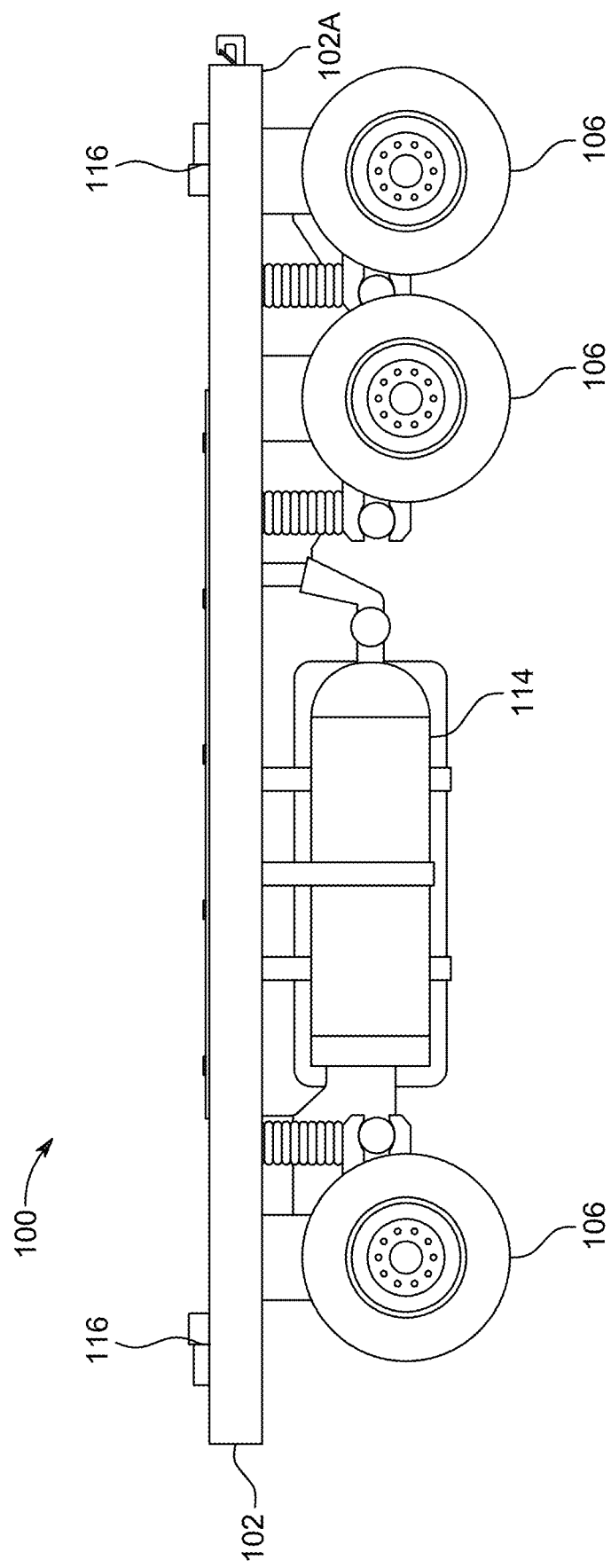
FIG. 2A is a left-side view of the emergency aircraft landing system depicting a longitudinal configuration of a mobile platform and a propulsion system, according to certain embodiments.

In various embodiments, the at least one jet engine 114 may be positioned at different locations along the frame 110 of the mobile platform 102. While FIG. 2A depicts the jet engine 114 mounted approximately mid-way along the length of the platform 102, the jet engine 114 may alternatively be positioned at the rear portion of the mobile platform 102, at the front portion, or at intermediate positions between the center and either end. The specific placement of the jet engine 114 is determined based on various factors including weight distribution, thrust requirements, and safety considerations. In particular, the jet engine 114 is strategically positioned such that the jet exhaust is directed away from the plurality of wheels 106 and the plurality of axles 108 to prevent thermal damage to these components. In some embodiments, heat shields or deflectors may be incorporated into the frame 110 to further protect the wheels 106 and axles 108 from jet exhaust, regardless of the engine placement.

Figure 2B:
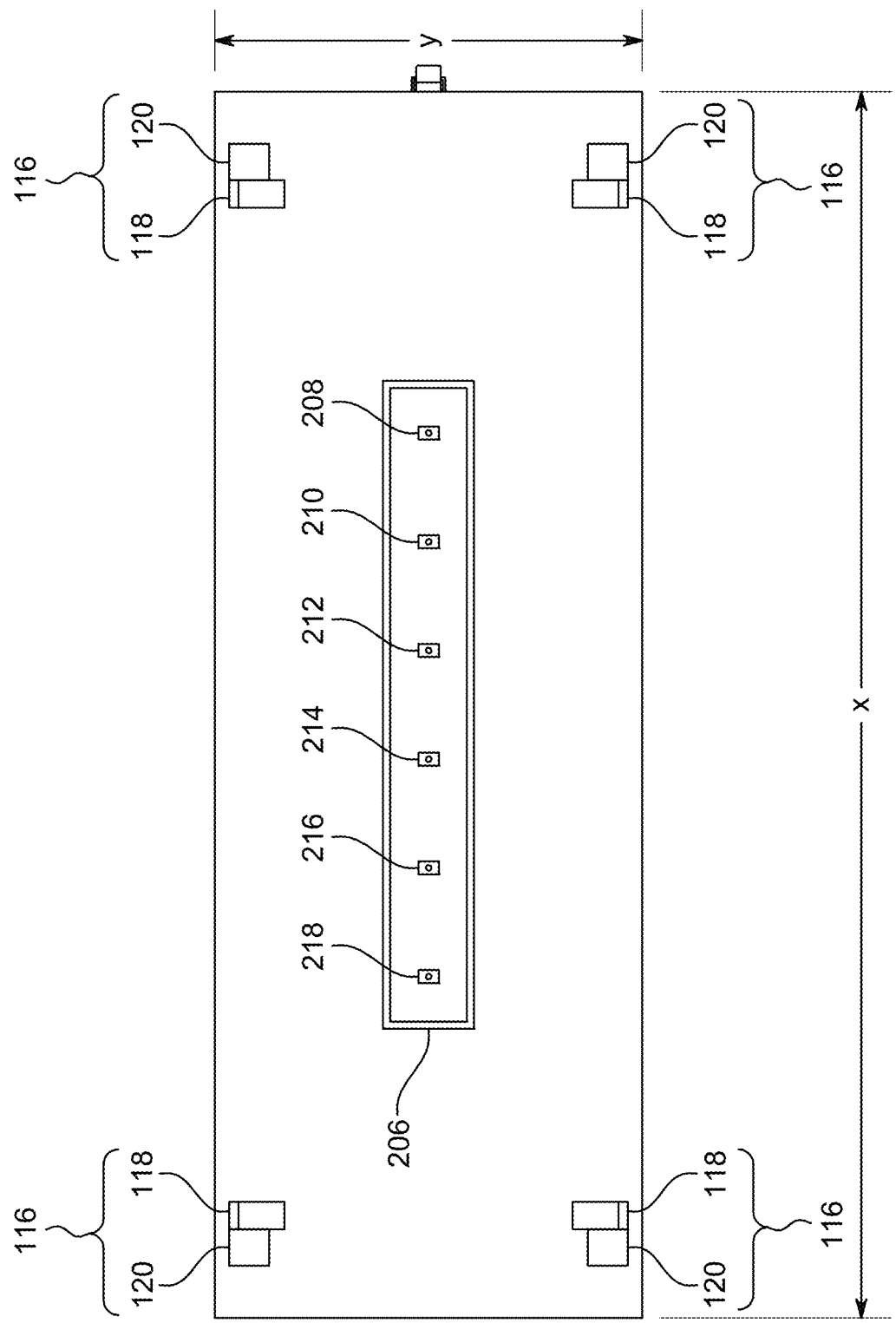
FIG. 2B is a top view of the emergency aircraft landing system illustrating a flat top surface and placement of guidance sensors, according to certain embodiments.
Figure 2C:
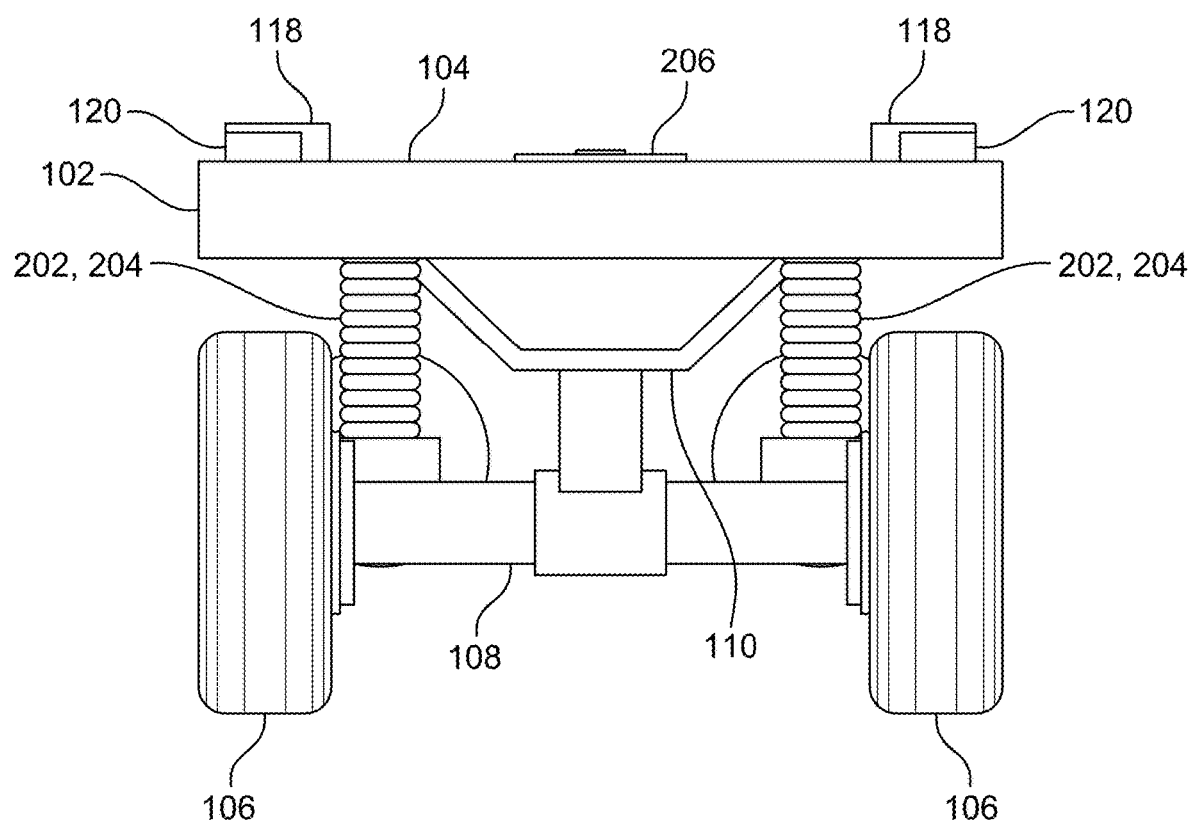
FIG. 2C is a front view of the emergency aircraft landing system depicting a frame and a heavy-duty suspension system incorporated therein, according to certain embodiments.
Figure 2D:
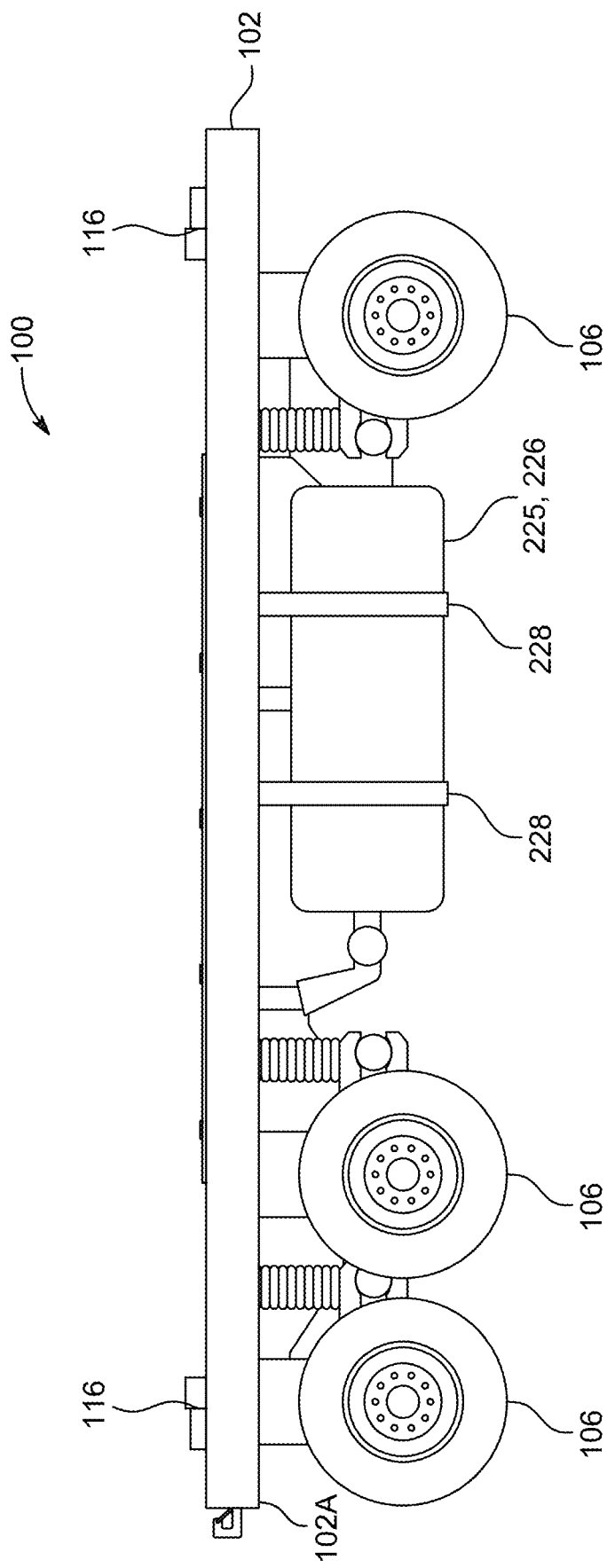
FIG. 2D is a right side view of the emergency aircraft landing system illustrating a fire suppression system incorporated therein, according to certain embodiments.

Referring to FIGS. 2A-2D, schematic views of the emergency aircraft landing system 100 are illustrated, according to certain embodiments. In particular, FIG. 2A illustrates a left side view of the system 100, FIG. 2B illustrates a top view of the system 100, FIG. 2C illustrates a front view of the system 100, and FIG. 2D illustrates a right side view of the system 100. Further, it is to be noted that, for clarity of illustration and ease of explanation, a portion of the wheels has been omitted from FIG. 2A and FIG. 2D so as not to obscure a view of certain components positioned beneath the mobile platform 102 and incorporated within the system 100. As can be seen from FIG. 2A, the propulsion system 112 is integrated along the frame 110 and is configured to accelerate the mobile platform 102 to the speed that corresponds to an approach speed of the aircraft, for rapid positioning and alignment with the approaching aircraft. In an exemplary embodiment, the propulsion system 112 may include a plurality of jet engines 114, where a number of the jet engines 114 included in the propulsion system 112 is determined based on a size of the system 100 and a configuration of the aircraft for which the system 100 is designed. In particular, the at least one jet engine 114 is securely mounted beneath the flat top surface 104, ensuring no protrusion above the landing plane. The at least one jet engine 114 may include turbojet or turbofan propulsion units, each selected based on thrust-to-weight ratio, responsiveness, and compatibility with aerodynamic and structural design of the mobile platform 102. The at least one jet engine 114 is operably coupled with the frame 110 of the mobile platform 102 configured to provide rapid acceleration along a runway or airstrip surface to achieve synchronization with the aircraft. In order to provide modular directional control and adaptability during deployment, the at least one jet engine 114 may be optionally equipped with thrust-vectoring nozzles, which allow for real-time modulation of exhaust flow direction. Such thrust-vectoring capabilities permit lateral steering, yaw correction, and accurate deceleration without relying solely on traditional wheel-based braking systems. In some examples, the thrust-vectoring nozzles may be coupled with electronically controlled actuators, including servomotors and hydraulic mechanisms, that adjust orientation of the thrust-vectoring nozzles based on feedback from onboard sensors and external telemetry inputs such as radar-tracked aircraft approach vectors and GPS-based trajectory data. The above described integration allows for autonomous and semi-autonomous alignment of the mobile platform 102 with the flight path of the aircraft, under crosswind and uneven terrain conditions.

Further, as can be seen from FIG. 2B, the securing mechanism 116 is operatively disposed along the flat top surface 104 of the mobile platform 102 and is configured to activate upon contact with an aircraft and secure the aircraft to the mobile platform 102 during deceleration. In some embodiments, the securing mechanism 116 includes a magnetic or clamping system 118 configured to be activated during the landing process, and a plurality of hydraulically extendable projections 120. More particularly, the magnetic or clamping system 118 is mounted flush along the flat top surface 104 of the mobile platform 102 and is configured to engage with designated metallic regions or specially reinforced contact surfaces located on an underside of the aircraft to suit the system 100. The magnetic or clamping system 118 may utilize electromagnets that are disposed in embedded recesses within the flat top surface 104. The aforementioned electromagnets are configured to remain inactive during high-speed approach to avoid interference but are automatically energized via a control signal triggered upon verified touchdown of the aircraft on the mobile platform 102. Touchdown detection may be achieved using pressure sensors, infrared proximity detectors, or inertial triggers distributed across the flat top surface 104, as depicted in the top view represented in FIG. 2B.

In some embodiments, the magnetic or clamping system 118 may include mechanically actuated servo-controlled clamping provisions that extend upward from a lateral periphery of the flat top surface 104 and are contoured to interface with a curvature of the aircraft fuselage or lower wing structures of the aircraft. In some examples, the clamping provisions may be mounted on rotatable and telescoping linkages that permit adaptive positioning, ensuring firm contact and retention without causing damage to aircraft structures. The magnetic or clamping system 118 may include force-limiting actuators, soft pads or elastomeric buffers to prevent stress concentrations or abrasion at the contact points. In order to further support the magnetic or clamping system 118, the securing mechanism 116 further includes the plurality of hydraulically extendable projections 120 that are positioned across a distributed grid beneath the flat top surface 104. The hydraulically extendable projections 120 may be structurally reinforced pistons, fabricated from durable and strong materials such as steel alloys incorporating titanium composites, and are actuated via an onboard hydraulic control system connected to a centralized pump and pressure regulation module. Furthermore, each hydraulically extendable projections 120 is retractable under the flat top surface 104 during transit or idle phases, and upon command, synchronized with aircraft touchdown, extends vertically to engage with predefined recesses, locking sleeves, and structural undercuts present on landing gear wells of the aircraft, belly fairings, or undercarriage reinforcement plates. The hydraulically extendable projections 120 may function as passive stoppers in order to arrest the aircraft, depending on the mode of engagement.

In some configurations, the hydraulically extendable projections 120 may be equipped with dampening sleeves in order to accommodate slight angular misalignments, and stroke lengths thereof may be dynamically adjustable based on real-time landing telemetry. In an exemplary embodiments, a feedback-controlled hydraulic module governs extension timing, force profile, and retraction speed, providing coordinated operation with the magnetic or clamping system 118. The above described adaptive engagement mechanism improves safety margins and prevents inadvertent roll or drift of the aircraft post-touchdown.

Referring again to FIG. 2B, which depicts the top view of the system 100, the mobile platform 102 has a long dimension 'x' and a short dimension 'y'. In other words, the mobile platform 102 is defined by a longitudinal dimension 'x' and a transverse dimension 'y', such that the mobile platform 102 is configured with an elongated rectangular or oblong geometry. The described geometric configuration is specifically designed to accommodate body lengths of varying aircraft types ranging from unmanned aerial vehicles (UAVs) and fighter jets to narrow-body and wide-body commercial airliners. In one exemplary embodiment, the long dimension 'x' may range from approximately 5 meters to 80 meters, preferably 10 meters to 70 meters, 15 meters to 60 meters, or 20 meters to 50 meters, depending on intended aircraft class, whereas the short dimension 'y' may range from 5 to 25 meters, 10 meters to 20 meters, or about 15 meters. The proportions of the mobile platform 102 are designed to provide both adequate landing surface area and high-speed mobility while maintaining compliance with airfield clearance standards.

In an alternative embodiment, the mobile platform 102 may be oriented such that its long dimension 'x' is perpendicular to the longitudinal axis of the aircraft fuselage during landing. In this configuration, the platform is positioned transversely across the runway with its long dimension extending from one side of the runway to the other. The plurality of wheels 106 maintain their axes of rotation perpendicular to the long dimension 'x', causing the mobile platform 102 to still travel along its short dimension 'y' during approach and landing operations. This alternative orientation provides a wider landing surface across the approach path of the aircraft, potentially offering improved lateral stability and greater margin for aircraft alignment during touchdown. Both orientations of the mobile platform 102 relative to the aircraft approach path may be employed depending on specific operational requirements, aircraft class, or runway constraints. The securing mechanism 116 and guidance sensors 206 would be correspondingly arranged to accommodate the selected orientation In some embodiments, the mobile platform 102 may comprise multiple sections linked together to form a composite landing surface. For example, two or more transversely oriented platform sections may be connected by articulated joints or flexible coupling mechanisms to form an extended landing area. This multi-section configuration provides a greater likelihood of contact with the aircraft fuselage during touchdown, particularly in emergency scenarios with limited pilot control. The linked sections can adapt to slight misalignments in the aircraft's approach path while maintaining structural integrity during the landing process.

Referring FIG. 2A and FIG. 2D, the plurality of wheels 106 are arranged along an underside of the mobile platform 102 in such a manner that axes of rotation of the plurality of wheels 106 are perpendicular to the long dimension 'x'. The above described orientation permits the plurality of wheels 106 to support longitudinal acceleration and deceleration aligned with the direction of aircraft approach. Such alignment helps during emergency interception, ensuring consistent directional stability and kinetic energy transfer between the mobile platform 102 and the aircraft which is performing an emergency landing.

In one embodiment, the plurality of axles 108 are configured to be orthogonally disposed with respect to the long axis 'x', each axle of the plurality of axles 108 supports dual or quad-wheel assemblies included in the plurality of wheels 106. A configuration of the plurality of wheels 106 may range from tandem axles in lightweight variants to multi-bogie configurations with 6 to 12 axles for large-scale heavy-duty applications. The aforementioned wheel arrangement further facilitates differential steering control through independent torque modulation or braking on the left and right wheel banks, allowing the mobile platform 102 to execute controlled directional adjustments during aircraft alignment, under high approach speed of an aircraft with a failed landing gear.

Referring now to FIG. 2C, illustrated is the front view of the emergency aircraft landing system 100, according to certain embodiments. As can be seen from FIG. 2C, the system 100 includes the frame 110 of the mobile platform 102, as well as an integrated heavy-duty suspension system 202 operatively secured thereto. In other words, the emergency aircraft landing system 100 includes the suspension system 202 secured to the frame 110 of the mobile platform 102. The heavy-duty suspension system 202 may be interchangeably referred to as the "suspension system 202" hereinafter for brevity in explanation. In some embodiments, the suspension system 202 includes multi-stage shock absorbers 204 configured to reduce impact loads during landing of the aircraft with failed landing gear on the mobile platform 102.

In an exemplary embodiment, the frame 110 includes a rigid metallic chassis constructed from high-tensile steel, titanium alloy, or aircraft-grade aluminum extrusions, reinforced with crossbeam weldments and load-dissipating gussets for maximum structural integrity. In one implementation, the suspension system 202 is mounted inboard of a wheelbase of the mobile platform 102 and is mechanically affixed to the frame 110 via a series of anchor brackets, pivot joints, and torsional tolerant linkage arms, allowing for limited vertical and angular displacement under load. In another implementation, the suspension system 202 is mounted outboard of the wheelbase, and is mechanically affixed to the frame 110 via a series of cone sets, pivot joints, and torsional tolerant linkage arms, allowing for limited vertical and angular displacement under load. Further, the suspension system 202 may include anti-roll bars for increased stability and resistance to rollover of the mobile platform 102 during high-speed maneuvers. Furthermore, the suspension system 202 may include lateral stabilizers, and vibration isolation mounts to mitigate side-loading effects during misaligned touchdowns or uneven terrain. Moreover, the suspension system 202 is configured within an impact-resistant housing or protective casing formed of composite armor or high-density thermoplastics to shield the suspension system 202 from foreign object debris (FOD) and environmental wear during deployment cycles.

In one implementation, the multi-stage shock absorbers 204 may include a first shock absorber, a second shock absorber, a third shock absorber, and a fourth shock absorber, each disposed at respective corners of the mobile platform 102. In another implementation, the heavy-duty suspension system 202 includes at least one multi-stage shock absorber 204 per wheel of the plurality of wheels 106. In an embodiment, the multi-stage shock absorber 204 may include a combination of coil-over-hydraulic dampers, twin-tube nitrogen-charged struts, or air-over-oil pneumatic shock modules, each capable of energy absorption across multiple stages of compression. The multi-stage configuration of the shock absorbers 204 refers to a progressive damping behavior in which distinct internal valve mechanisms and flow restrictors govern resistance at increasing pressure levels, permitting for soft initial compliance under moderate vertical displacement and rigid high-rate absorption during high-impact landings and abrupt vertical deceleration. In an example, during initial touchdown of an aircraft onto the mobile platform 102, a first stage of compression may be activated by low-amplitude vertical forces, allowing the multi-stage shock absorbers to compress with low resistance, cushioning the airframe and preventing rebound. Further, as the impact force escalates, specifically in high-mass, high-speed landings, a second and third stage of compression is engaged, characterized by narrowed orifices, spring-loaded piston valves, and variable aperture bypass ports that impose greater hydraulic resistance, converting vertical kinetic energy, transferred by the aircraft onto the mobile platform 102, into heat, and further minimize force transmission to the mobile platform 102 and the aircraft.

In some implementations, each multi-stage shock absorber 204 includes a thermal expansion reservoir, a fluid recirculation loop, and an active pressure modulation valve, allowing for real-time adjustment of damping rates in response to dynamic payload conditions exerted by the aircraft. In some alternate implementations, an electrohydraulic control unit may be electronically interfaced with platform control systems and equipped with proximity sensors, gyroscopes, or inertial measurement units (IMUs) to pre-emptively prime the suspension system 202 for landing events based on predictive telemetry of the aircraft, conducted by aircraft flight data. In summary, the heavy-duty suspension system 202, as depicted in FIG. 2C, is structurally and functionally integrated with the frame 110 of the mobile platform 102 and is designed to reduce impact loads during emergency landing operations through the use of multi-stage shock absorbers 204. The system thereby ensures both the structural preservation of the platform and the safety of the aircraft fuselage and occupants, while also enhancing operational readiness across a wide range of aircraft classes and environmental conditions.

Referring again to FIG. 2B, the emergency aircraft landing system 100, includes one or more guidance sensors 206 arranged in a linear array along a longitudinal center and a perimeter of the flat top surface 104 of the mobile platform 102. The one or more guidance sensors 206 are configured to provide real-time positional tracking, aircraft alignment, and precision approach management during emergency landing sequences. In some embodiments, the one or more guidance sensors 206 include at least one of radar sensor 208, an optical alignment marker 210, a laser position indicator 212, a light detection and ranging (LIDAR) sensor 214, an infrared (IR) sensor 216, and a radio frequency identification (RFID) marker 218. Each sensor of the one or more guidance sensors 206 is physically mounted on recessed brackets corresponding to each sensor, that are mechanically secured to the flat top surface 104 of the mobile platform 102 such that the sensors remain flush or minimally protrusive, preventing interference with the landing trajectory of the aircraft and reducing potential damage during contact. The recessed brackets may be fabricated from lightweight, high-strength polymer composites or corrosion-resistant metallic alloys, and are anchored into the flat top surface 104 of the mobile platform 102 using fasteners compliant with MIL-STD-1312 mechanical standards to ensure vibration resistance. In some embodiments, the one or more sensors 206 may be covered by a transparent polycarbonate shielding member in order to protect the one or more sensors 206 from an impact sustained on the flat top surface 104 via the emergency landing of the aircraft.

In some embodiments, the one or more guidance sensors 206 are electrically and operably coupled to a central control unit 220 (shown schematically in FIG. 5), which is embedded within the structural chassis of the mobile platform 102. Particularly, the one or more guidance sensors 206 are electrically connected to the central control unit 220 via shielded wiring harnesses (not shown) embedded within the mobile platform 102. The shielded wiring harnesses are routed through internal conduits within the mobile platform 102 to prevent electromagnetic interference and physical wear. The central control unit 220 is configured with embedded firmware capable of receiving, processing, and interpreting data signals from the one or more guidance sensors 206, and subsequently the one or more guidance sensors 206 are configured transmit positional data to guide the emergency aircraft landing system 100 during landing. In operational use, the one or more guidance sensors 206 continuously transmit positional, angular, and velocity data during aircraft approach, enabling the emergency aircraft landing system 100 to perform real-time adaptive adjustments for appropriate alignment. The one or more sensors 206 ensures that the mobile platform 102 accurately tracks the flight and landing path of the incoming aircraft and maintain proper orientation and velocity, permitting a safe and controlled emergency landing in scenarios involving compromised pilot visibility and aircraft guidance system failure.

In particular, the radar sensor 208 may be used for wide-angle distance measurement and obstacle detection, enabling the system 100 to determine a range and azimuth of the approaching aircraft, as well as to detect other moving or static objects present along the runway or in a flight path of the aircraft. The radar sensor 208 may operate in the millimeter-wave band such as, 24 GHz or 77 GHz for high-resolution, short-range precision, and may be mounted in a forward-facing orientation on the flat top surface 104. In one implementation, the radar sensor 208 may be integrated within a forward structural housing of the mobile platform 102.

Further, the optical alignment marker 210 may include a high-intensity light emitting diode (LED) strip, a sequence of low-profile photoluminescent indicators, or paint-based retroreflective elements, all configured to provide visual reference cues for aircraft pilots operating under visual flight rules (VFR) during low-light landing conditions such as dusk and dawn. The optical alignment marker 210 may be controlled via pulse-width modulation (PWM) drivers to allow for blinking and pulsing effects synchronized with platform motion, improving visibility and alignment confirmation from a cockpit of the aircraft. Furthermore, the laser position indicator 212 may emit one or more collimated laser beams aligned along the centerline of the mobile platform 102. The laser position indicator 212 may utilize class I or class II safe laser diodes and are preferably activated as the aircraft crosses a predetermined approach threshold, aiding in real-time centerline tracking and confirming lateral accuracy of aircraft descent The LIDAR sensor 214 may provide high-resolution 3D spatial mapping and vertical distance calculation, using at least one of a time-of-flight measurement or a phase-shift analysis. In some embodiments, the LIDAR sensor 214 may repeatedly scan airspace above and immediately around the flat top surface 104 of the mobile platform 102 in order to generate a point cloud representation of an underbelly of the aircraft to evaluate descent rate, clearance margin, and surface conformity. The aforementioned data may be used by a central control unit 220 to issue real-time thrust, braking, or platform position adjustments. Further, the IR sensor 216 may be configured to detect thermal signatures of the approaching aircraft, specifically useful under limited visibility conditions such as fog, smoke, and night operations. The IR sensor 216 may include uncooled microbolometer arrays or cooled mid-wave IR (MWIR) detectors, and may be calibrated to detect the temperature differentials between the ambient environment and engine nacelles, undercarriage, and exhaust plume of the aircraft.

The radio frequency identification (RFID) marker 218 may include at least one of an active or passive RFID transceiver, positioned flush with or embedded in the flat top surface 104 of the mobile platform 102. The RFID marker 218 is configured to interface with corresponding RFID tags and transponders installed on the aircraft fuselage and landing bay structures. In one example, when in proximity, the RFID marker 218 may establish a data link to confirm the identity of the aircraft, verify alignment, and facilitate platform-to-aircraft synchronization. In some embodiments, the RFID marker 218 may further relay aircraft class, mass configuration, and descent profile data to the central control unit 220 to dynamically adjust securing and deceleration parameters. Collectively, the one or more guidance sensors 206 forms a multi-modal detection and guidance architecture, providing redundant sensing capability, environmental adaptability, and positional resolution required for high-precision emergency landings of the aircraft. The one or more guidance sensors 206, individually or in combination, are electrically connected via shielded wiring harnesses (not shown) to a central control unit 220, and outputs thereof are processed using embedded logic and sensor fusion algorithms to maintain dynamic control over platform alignment, speed matching, and aircraft capture processes.

Referring to FIG. 2D, which illustrates a right side view of the emergency aircraft landing system 100, further structural and functional detail is provided hereinafter. In some embodiments, the system 100 includes a compressed gas fire suppression system 225 integrally mounted beneath the mobile platform 102 and configured to mitigate and extinguish post-touchdown fire hazards that may arise due to factors such as, but are not limited to, fuel leakage, frictional overheating, and electrical faults involved in emergency landing operations of the aircraft. In some embodiments, the fire suppression system 225 includes one or more suppression storage tanks 226 disposed beneath the mobile platform 102. In particular, each tank of the one or more suppression storage tanks 226 contains a pressurized fire-suppressing agent. In some implementations, the pressurized fire-suppressing agent may include, but is not limited to, carbon dioxide ($CO_2$), nitrogen ($N_2$), halotron, FM-200 (heptafluoropropane), and dry chemical powders such as monoammonium phosphate. The pressurized fire-suppressing agent are chosen based on effectiveness thereof in rapidly displacing oxygen, cooling high-temperature surfaces, and disrupting the combustion process without causing damage to sensitive aircraft structures and onboard systems.

The one or more suppression storage tanks 226 may be cylindrical pressure vessels fabricated from high-strength, corrosion-resistant materials such as, but not limited to, stainless steel and composite-wrapped aluminum. The one or more suppression storage tanks 226 are mechanically fastened via shock-resistant mounts 228 to the underside of the mobile platform 102. The shock-resistant mounts 228 are vibration-dampened and positioned symmetrically to maintain balance and center of mass during platform acceleration and deceleration.

In some implementations of the present disclosure, each storage tank of the one or more suppression storage tanks 226 is connected to a network of distribution conduits and discharge nozzles, which are routed across the lateral and longitudinal dimensions beneath the flat top surface 104 of the mobile platform 102. The nozzles may be configured to release the pressurized fire-suppressing agent in a conical spray pattern or directed jet, depending on the nozzle type. The nozzles may include temperature-activated valves, electrically actuated solenoids, or pyrotechnic release mechanisms, which may be operably coupled to a fire control module housed within a sealed compartment in the frame 110 in order to shield the fire control module from high temperatures and fire hazards. In an example, the fire control module may receive input signals from temperature sensors, smoke detectors, and from the central control unit 220, and is programmed with logic that detects abnormal heat signatures, flame presence, or chemical markers associated with fuel combustion. Upon detection of a fire-related anomaly, the fire control module initiates a rapid discharge sequence that releases the pressurized fire-suppressing agent through the nozzles, targeting a specific location of fire hazard. In some examples, the compressed gas fire suppression system 225 may be segmented into independently controlled zones, each corresponding to a specific region beneath the mobile platform 102 such as front, midsection, and rear. The aforementioned zoning configuration permits localized suppression, conservation of extinguishing material, and minimized interference with aircraft recovery operations.

Furthermore, a manual override interface may be provided at a console of a ground operator (or embedded in a secured panel on the mobile platform 102), providing emergency actuation in case of a failure of the compressed gas fire suppression system 225. In addition, the compressed gas fire suppression system 225 is designed and tested to meet regulatory standards such as NFPA 2001 and applicable FAA/EASA aircraft ground equipment safety guidelines.

Figure 3:
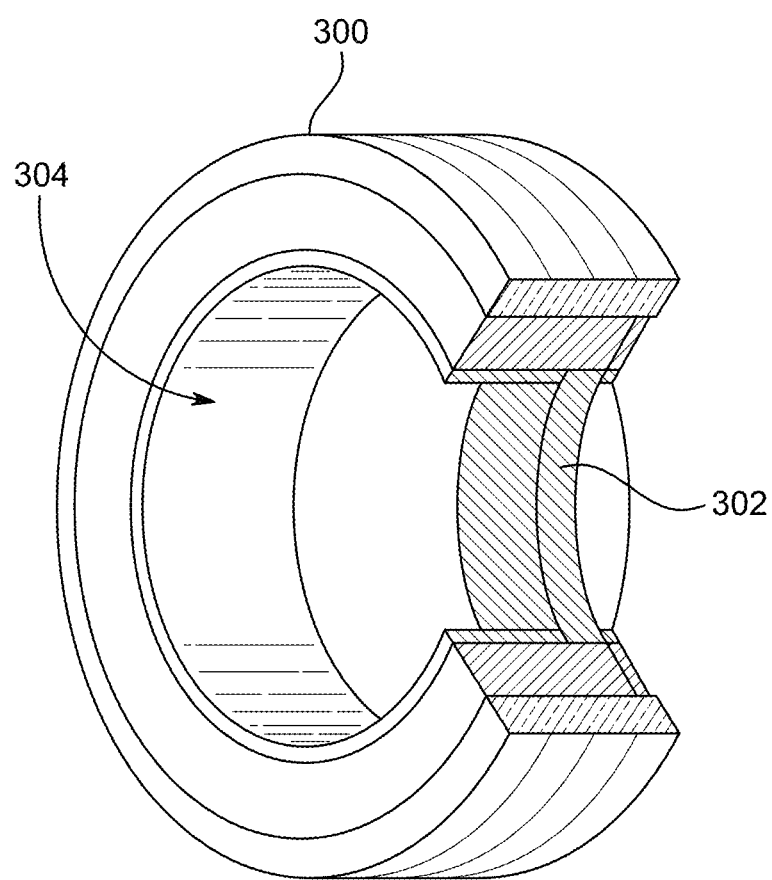
FIG. 3 is a sectional view of a tire incorporated in a plurality of wheels, depicting a circumferential groove tread pattern and fusible plug configuration of the tire, according to certain embodiments.

Referring to FIG. 3, illustrated is a sectional view of a wheel of the plurality of wheels 106, according to certain embodiments. In particular, the plurality of wheels 106 includes tires 300 (only one shown in FIG. 3 as a sectional view) having a circumferential groove tread pattern. The tires 300 are engineered for sustained high-speed operation and extreme thermal load conditions encountered during high-friction landings. In one implementation, the tires 300 are fabricated from multi-layered composite rubbers, reinforced with aramid or steel mesh belts, and coated with temperature-resistant synthetic elastomers. The outer surfaces of the tires are molded with the circumferential groove tread pattern, where longitudinal grooves run perpendicular to the axis of rotation. The circumferential groove tread pattern provides improved traction, facilitate water dispersion, and maintain consistent rolling resistance under surface contaminants and runway precipitation. The circumferential grooves tread pattern further mitigates the risk of aquaplaning and provide pressure equalization during touchdown and rolling engagement with the aircraft fuselage or gear bays.

In order to further improve operational safety under thermal stress, each wheel of the plurality of wheels 106 includes fusible plugs 302 disposed on an inside 304 of the plurality of wheels 106, configured to melt at a predetermined temperature to prevent an explosion of a wheel of the plurality of wheels 106. In particular, the fusible plugs 302 are engineered to melt at the predetermined temperature, in a range of 160° C. to 250° C., depending on a design of the plurality of wheels 106 and the tires 300. The fusible plugs 302 are constructed from low-melting-point materials such, but are not limited to, alloys including bismuth-tin, eutectic lead-free solder, and thermoplastic polymers. Further, the fusible plugs 302 are embedded near a valve stem region of the wheel. During high-speed landings or extended braking maneuvers, if heat buildup due to friction or brake drag causes internal wheel cavity temperatures to exceed the predetermined temperature, the fusible plugs 302 melt, allowing pressurized gas within the tires 300 to vent in a controlled manner. The foregoing sequence prevents catastrophic over-pressurization and explosion of the tires 300, consequently mitigating risk of structural damage to the mobile platform 102 and the aircraft during the deceleration phase of the system 100.

In some implementations, each wheel of the plurality of wheels 106 may include multiple fusible plugs 302 spaced equidistantly to provide directional venting and to preserve tire balance during pressure relief. In addition, smart temperature sensors and onboard thermal monitoring systems may be coupled with the fusible plugs 302 in order to provide predictive maintenance alerts or emergency shutoff commands to the propulsion system 112. Collectively, the described tread pattern and fusible plugs 302 form an integral part of safety and performance enhancement system for the emergency aircraft landing system 100, rendering the mobile platform 102 suitable for high-stress, multi-class aircraft recovery operations, and in compliance with airfield equipment safety codes and aviation emergency standards.

Figure 4:
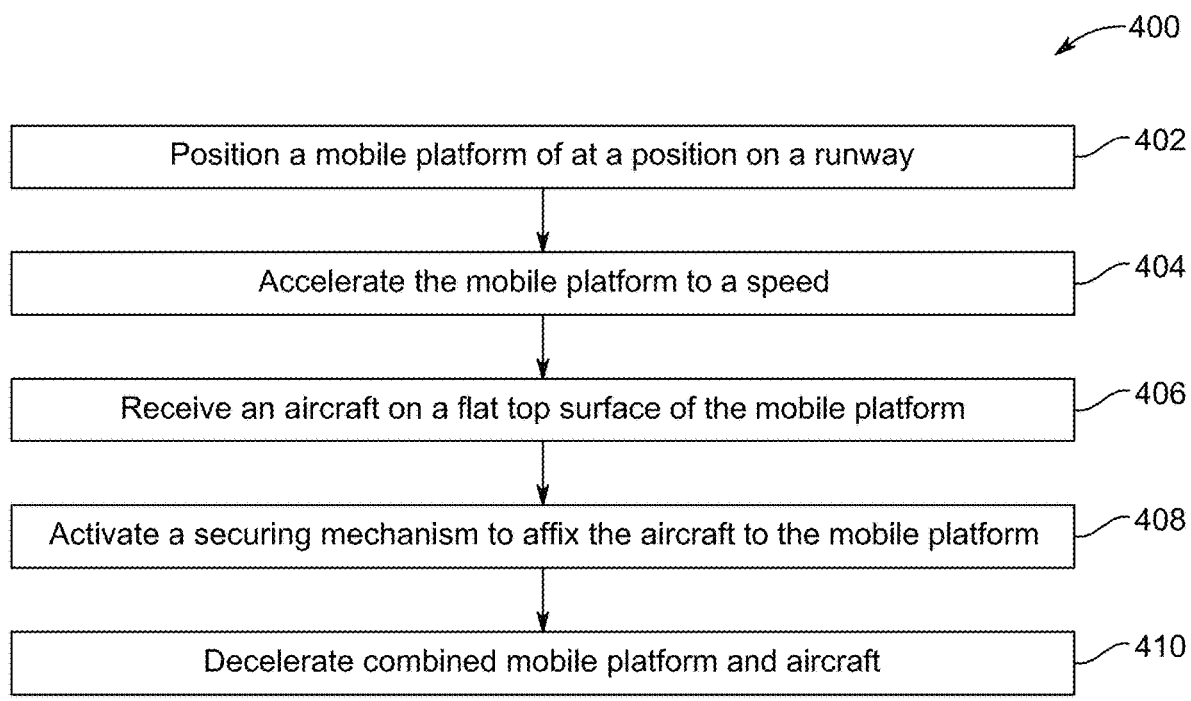
FIG. 4 is a flowchart depicting a method for emergency landing of an aircraft experiencing landing gear malfunction, according to certain embodiments.

Referring to FIG. 4, illustrated is a method 400 for emergency landing of an aircraft experiencing landing gear malfunction, according to certain embodiments. It should be understood that the illustrated method 400 is presented for exemplary purposes only and is not intended to be limiting. The steps depicted in the method 400 may be performed in any suitable order, may be combined or subdivided, and may include additional steps or omit certain steps, without departing from the intended scope of the present disclosure. Furthermore, although the method 400 is illustrated and described as a sequence of discrete operations, such representation is not intended to require that the method 400 be performed in a rigid stepwise manner. Rather, steps may be executed in parallel or in differing temporal sequences, depending on the implementation architecture, without affecting the overall functionality or objectives of the present disclosure. Furthermore, the method 400 is implemented through coordinated interaction between an incoming aircraft and the emergency aircraft landing system 100 as previously described with respect to FIGS. 1-3.

At a step 402, the method 400 includes positioning the mobile platform 102 at a position on a runway. In particular, the mobile platform 102 is positioned at a designated location on the runway or equivalent surface capable of supporting dimensions and dynamic motion requirements of the system 100. The positioning may be pre-determined based on air traffic control advisories and dynamically altered in response to real-time telemetry from the aircraft. The positioning of the mobile platform 102 on the runway may be performed manually by ground crew and/or automatically via GPS-based system integrated into the central control unit 220 of the system 100. In some embodiments, platform positioning includes alignment checks using data from the LIDAR sensor 214, radar sensor 208, and RFID marker 218, which together confirm geometric compatibility between the longitudinal axis of the mobile platform 102 and a projected approach vector of the aircraft. The positioning ensures that the mobile platform 102 is located within a spatial window that allows for unimpeded aircraft descent and landing trajectory. The mobile platform 102 may further use auxiliary sensors such as gyroscopes to confirm an orientation thereof and ensure that the flat top surface 104 remains substantially planar and level. In uneven terrain, where rapid repositioning is required, additional support mechanisms such as deployable outriggers and active suspension levelling (via suspension system 202) may be engaged to stabilize the mobile platform 102. Post appropriate positioning, the mobile platform 102 enters a state in which subsequent operations may be triggered in response to aircraft proximity and control signals.

At a step 404, the method 400 includes accelerating the mobile platform 102 to a speed. In other words, the mobile platform 102 is accelerated to a speed that substantially matches the landing velocity of the incoming aircraft. The propulsion system 112, which includes the at least one jet engine 114 mounted longitudinally beneath the flat top surface 104, is activated to initiate linear motion of the mobile platform 102 along the runway. In an example, the propulsion system 112 may be controlled using dynamic thrust modulation algorithms stored in an on-board memory and executed by a processor (shown in FIG. 5), which processes real-time speed data transmitted from avionics suite of the aircraft via encrypted radio-frequency communication links or telemetry. Acceleration of the mobile platform 102 is synchronized with the approach speed of the aircraft in order to provide a minimally disruptive transfer of momentum during touchdown of the aircraft onto the mobile platform 102. The system 100 may further rely on predictive acceleration modelling to anticipate minor variations in aircraft approach speed and to compensate for wind shear or runway slope. Moreover, differential braking on the plurality of wheels 106, combined with minor thrust-vectoring through adjustable jet nozzles, allows the platform to perform real-time trajectory corrections and lateral adjustments during landing phase. In some examples, the mobile platform 102 may enter a fixed speed state once the threshold landing speed is attained, providing the system 100 to coast under inertia and fine-tune final positioning using minor corrective forces exerted by the propulsion system 112. Furthermore, acceleration phase of the mobile platform 102 is configured to conclude prior to touchdown or at the moment of initial contact between the aircraft and the flat top surface 104 of the mobile platform 102.

At a step 406, the method 400 includes receiving the aircraft on the flat top surface 104 of the mobile platform 102. As such, the step 406 highlights physical reception of the descending aircraft onto the flat top surface 104 of the mobile platform 102. At this stage, the one or more guidance sensors 206 continuously relay positional and vertical descent data to the central control unit 220, which ensures that the aircraft remains aligned with the platform during final descent. As the aircraft descends without a landing gear deployed, the fuselage structural surface makes direct contact with the flat top surface 104, which is engineered to absorb and distribute impact loads across the frame 110. Further, the one or more sensors 206 within the mobile platform 102 may trigger an automatic shift into a deceleration mode immediately upon registering contact of the aircraft onto the flat top surface 104. As such, the aircraft experiences an inelastic collision with the mobile platform 102, such that the kinetic energy is not fully conserved but is partially converted to heat and deformation energy. A combined mass of the aircraft and the mobile platform 102 moves together as a unit during the deceleration phase, as described in further detail below.

At step 408, the method 400 includes activating the securing mechanism 116 to affix the aircraft to the mobile platform 102. In other words, upon verified contact between the aircraft and the mobile platform 102, the securing mechanism 116 is activated to affix the aircraft to the mobile platform 102. As described, the securing mechanism 116 includes multiple independently controlled subsystems such as the magnetic or clamping system 118 and the hydraulically extendable projections 120. Initially, the magnetic or clamping system 118 is energized to establish a temporary but powerful magnetic bond between conductive contact zones on the aircraft belly and embedded magnets located beneath the flat top surface 104 of the mobile platform 102. The aforementioned electromagnetic locking effect reduces relative motion and allows for smoother engagement of secondary locking systems which includes mechanical clamps. Subsequently, in some configurations, the mechanical clamps, positioned along the perimeter and midline of the platform, are actuated using servo-controlled pneumatic arms. The mechanical clamps extend and conform to the curvature or structural features of the underbelly of the aircraft, gripping the aircraft securely to the mobile platform 102 in order to prevent a lateral drift. Further, post the mechanical clamps are locked, hydraulically extendable projections 120 are deployed through apertures in the flat top surface 104, interfacing with aircraft anchoring hardpoints to finalize securing process of the aircraft to the system 100. Conclusively, the activation of the securing mechanism 116 includes three sub-steps including engaging electromagnetic system included in the magnetic or clamping system 118 to create an initial magnetic bond, activating mechanical clamps included in the magnetic or clamping system 118 to provide secondary securing of the aircraft onto the mobile platform 102 and, extending the plurality of hydraulically extendable projections 120 to physically interface aircraft locking points. Moreover, each stage of the aforementioned securing sequence is managed by the control unit 220, using real-time feedback from the one or more guidance sensors 206 to modulate clamping force and ensure balanced engagement without inducing fuselage damage. In some configurations, sensor fusion algorithms validate aircraft position and weight distribution before authorizing final hydraulic deployment.

At a step 410, the method 400 includes decelerating the combined mobile platform 102 and aircraft. In particular, the combined system (aircraft and the mobile platform 102) enters a controlled deceleration phase. The deceleration is achieved through a combination of passive rolling resistance, dynamic thrust reversal, and application of braking torque via the plurality of wheels 106. The multi-axle configuration of the mobile platform 102 provides distributed braking capability through disc or drum brake units operatively coupled to each wheel of the plurality of wheels 106. In certain high-speed configurations of the system 100, regenerative braking modules may be included to absorb kinetic energy and convert the absorbed kinetic energy into electrical energy for reuse in the system 100. Further, a rate of deceleration is calculated based on combined mass, platform inertia, and runway length constraints. Anti-skid control and wheel slip monitoring may be employed to provide uniform braking to the plurality of wheels 106 and to further avoid instability of the mobile platform 102. The suspension system 202, as described above, is vital for absorbing vertical rebound and minimizing shock loads that are exerted by the aircraft performing the emergency landing onto the mobile platform 102. In conclusion, the aircraft lands on the moving mobile platform 102 in inelastic collision, and the combined aircraft and mobile platform 102 are gradually decelerated. Inelastic collision in this context is characterized by loss of kinetic energy in the form of deformation, sound, and heat, while the momentum of the combined aircraft and the mobile platform 102 is conserved. Energy-absorbing materials within the mobile platform 102 and suspension system 202 may contribute to dissipating impact forces, while the one or more guidance sensors 206 may quantify force vectors for adaptive braking modulation.

In some embodiments, the method 400 further includes communicating speed and position data between the mobile platform 102 and the aircraft to facilitate synchronized movement during landing. In some implementations, the aforementioned communication may be achieved via a duplex communication protocol using RF telemetry, Li-Fi optical links, and secure military-grade frequency hopping spread spectrum systems. Positional data from GNSS or differential GPS modules onboard both the aircraft and the system 100 may be compared in real-time by the processors on-board the aircraft and the system 100, in order to maintain trajectory lock and timing coordination. Aircraft autopilot systems may receive continuous feedback to adjust pitch, descent angle, and approach speed based on platform telemetry, ensuring synchronization for high accuracy.

In some embodiments, the method 400 includes maintaining the aircraft's landing gear in a retracted position during the landing process. As such, the retracted landing gear configuration is configured to reduce a risk of friction induced fires during emergency landing and minimize potential structural damage that may lead to passenger injury or structural collapse. Retracted landing gear configuration reduces the possibility of high friction contact between damaged or partially extended gear components and the flat top surface 104 of the mobile platform 102, which may otherwise cause sparks, heat buildup, or fuel line ruptures. In addition, landing without extended landing gear helps distribute impact forces more evenly across the fuselage of the aircraft, which is designed to absorb belly landings under such contingencies. The retracted landing gear configuration mechanically reduces risk by eliminating the contact between landing gear components and the platform surface, thereby preventing friction-induced heat and sparks that could ignite fuel or hydraulic fluid. Pilot instructions, ATC directives, or autonomous avionics logic may enforce gear retraction prior to engagement with the platform.

Figure 5:
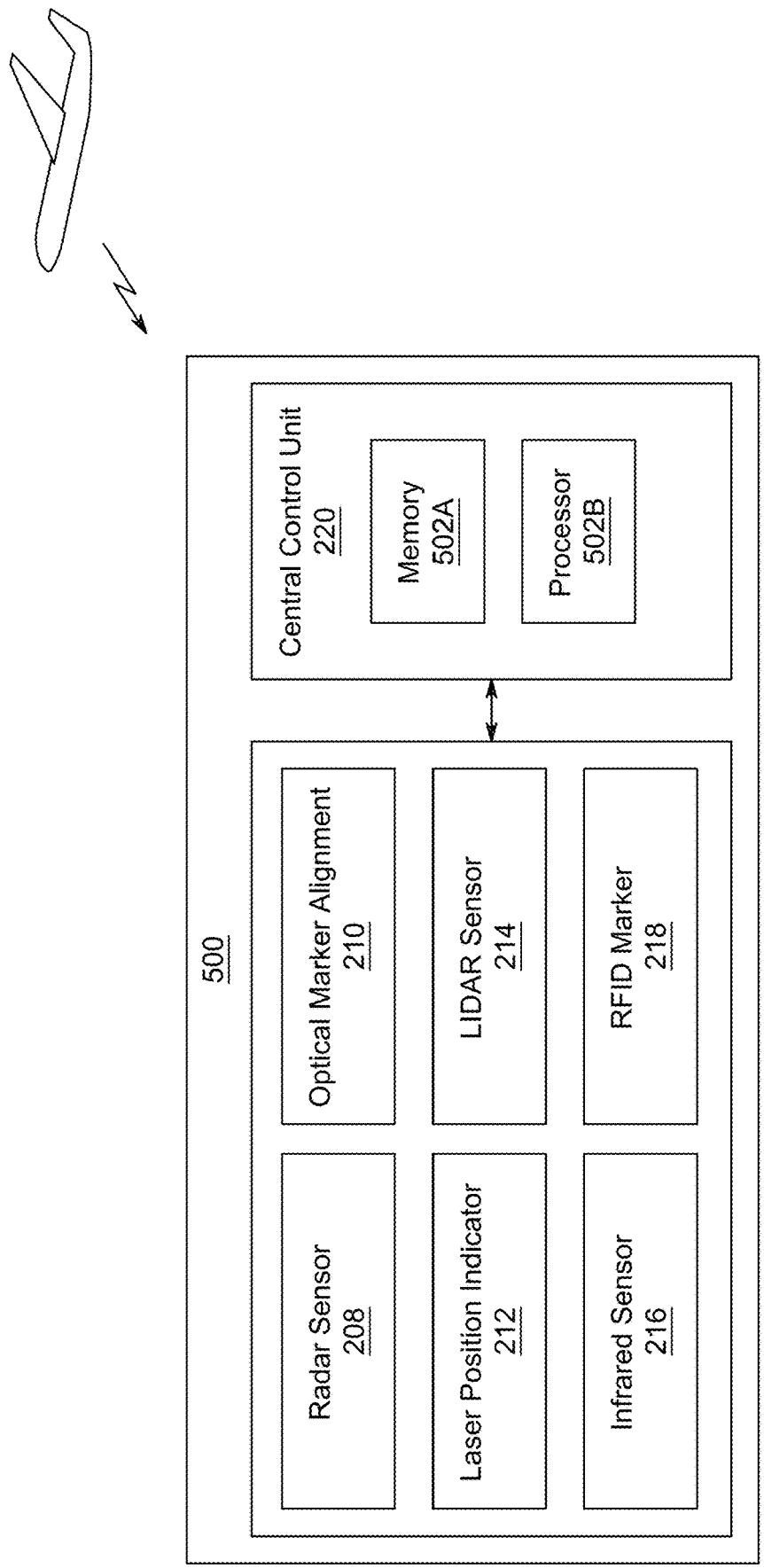
FIG. 5 is a block diagram illustrating a communication interface and an exemplary electronic communication route between the aircraft experiencing landing gear malfunction and guidance sensors operatively connected to a control unit, according to certain embodiments.
Figure 6:
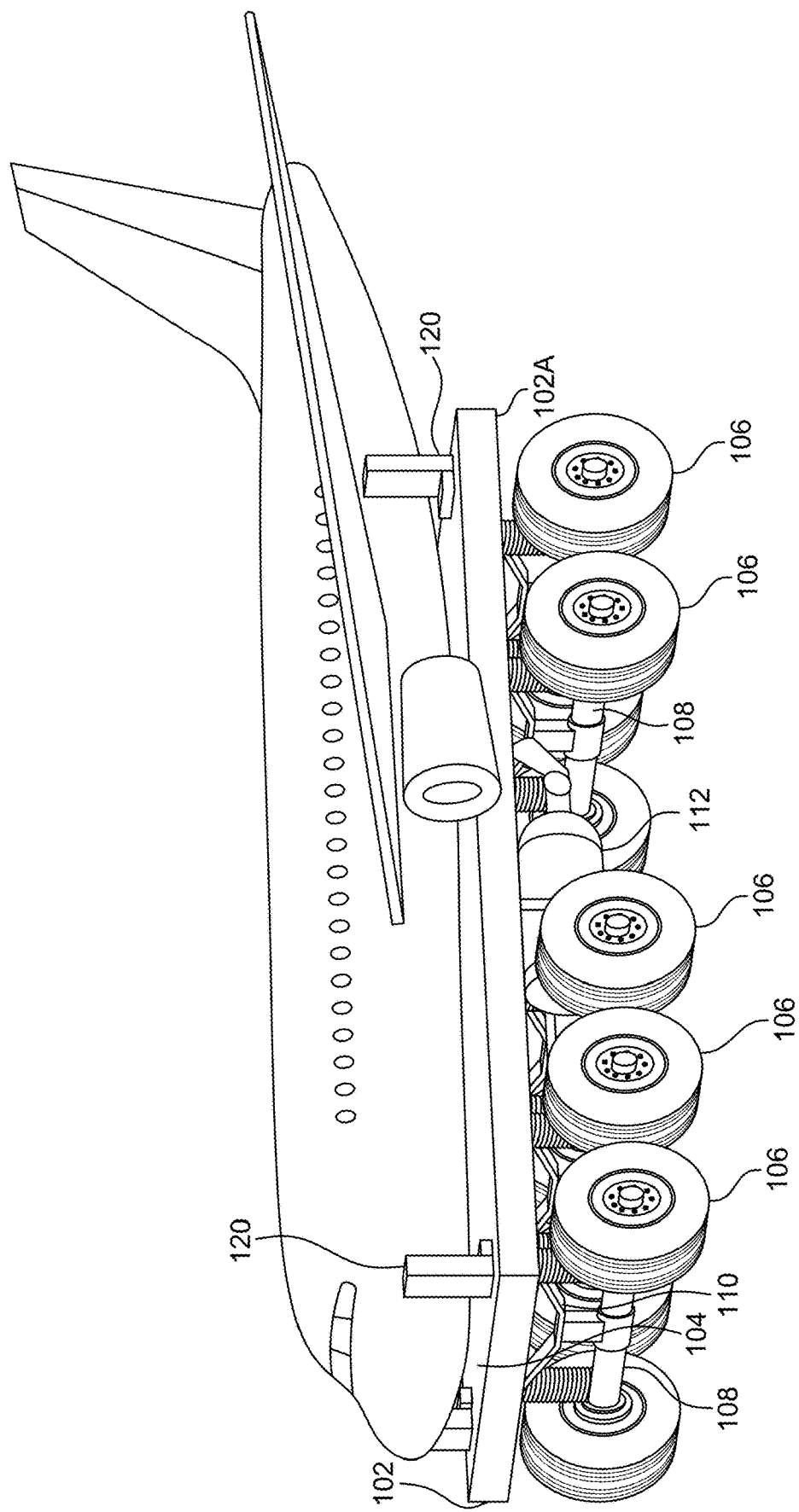
FIG. 6 is an exemplary schematic perspective view depicting the aircraft experiencing landing gear malfunction in a landed state on the emergency aircraft landing system, according to certain embodiments.

Referring to FIG. 5, illustrated is a schematic block-level representation of a communication interface 500 between the one or more guidance sensors 206 and the aircraft performing an emergency landing with malfunctioning landing gear, according to certain embodiments. In particular, FIG. 5 is intended to conceptually depict an exchange of positional, alignment, and synchronization data between the aircraft experiencing landing gear malfunction and the one or more guidance sensors 206 on-board the mobile platform 102, as described above in the top view of the system 100. As can be seen from FIG. 5, the one or more guidance sensors 206 are represented as a logical block including individual sensors, specifically, the radar sensor 208, optical alignment marker 210, laser position indicator 212, LIDAR sensor 214, infrared sensor 216, and radio frequency identification (RFID) marker 218. The one or more guidance sensors 206 are positioned in a predefined spatial configuration along the flat top surface 104 of the mobile platform 102, as previously shown in FIG. 2B.

In some implementations, the aircraft and the system 100 undergo a bidirectional electronic communication which is executed to exchange a set of data including a plurality of information from the one or more guidance sensors 206 and location and telemetry data from the aircraft. Further, the bidirectional electronic communication may include real-time, closed-loop exchange of data between the one or more guidance sensors 206 and the aircraft. In an example, such data exchange may include, but is not limited to, aircraft velocity vectors, descent profiles, fuselage alignment data, temperature signatures, proximity measurements, centerline deviation corrections, and positional confirmations. The bidirectional electronic communication may occur via at least one of line-of-sight radio frequency (RF) links, passive RFID coupling, infrared signaling, or sensor reflection measurements, depending on the modality of each sensor of the one or more guidance sensors 206.

The one or more guidance sensors 206 are operatively and electrically connected to the central control unit 220, which serves as the central computational and logic processing subsystem of the emergency aircraft landing system 100. The central control unit 220 includes an embedded memory module 502A for storing sensor calibration data, algorithmic landing sequences, and aircraft telemetry profiles. The memory module 502A may include non-transitory computer-readable storage such as flash memory, EEPROM, or solid-state storage, and is configured to retain mission-critical data even during power fluctuations. Furthermore, the central control unit 220 includes a processor 502B, which is configured to execute instruction sets and firmware logic to interpret incoming data from the one or more guidance sensors 206, assess aircraft descent patterns, and generate control signals for actuating the propulsion system 112, securing mechanism 116, and fire suppression system 225. The processor 502B may be a dedicated real-time processor, microcontroller, or multicore system-on-chip (SoC), depending on the computational requirements of the platform. However, in some embodiments, the processor 502B may be any other logical operation executing device known in the art.

Further, during the landing process, as the aircraft with the malfunctioning landing gear approaches the mobile platform 102, the one or more guidance sensors 206 continuously relay sensor data to the processor 502B, which executes multi-sensor fusion algorithms to triangulate aircraft position and velocity. Based on the set of data received from the one or more guidance sensors 206, the processor 502B determines whether conditions for safe reception and capture are met and may trigger downstream systems to enter active or standby states accordingly.

The aspects of the present disclosure provide the emergency aircraft landing system 100. The emergency aircraft landing system 100 may be utilized as an integrated, ground-based recovery architecture that enables a controlled reception and deceleration of aircraft experiencing landing gear malfunction. The system 100 is deployable across a wide range of aviation scenarios, including commercial aviation terminals, forward-operating military bases, naval landing platforms, temporary disaster relief airstrips, and remotely located airfields lacking access to conventional crash recovery and arrestment systems. The emergency aircraft landing system 100 is operable in both civil and defense aviation domains, providing emergency support in adverse conditions where conventional landing gear deployment in aircraft is unavailable due to mechanical failure, combat damage, or flight system malfunction. Further, the system 100 by a design thereof significantly mitigates likelihood of fuselage rupture, fuel tank breaches, and post-impact fires by eliminating a requirement for emergency belly landings of the aircraft, directly onto runway pavement. Hence, the system 100 reduces potential for passenger injury, aircraft write-off incidents, and extended runway closures resulting from debris, fluid spills, or surface deformation. In commercial operations, the implementation of the system 100 may lead to a reduction in insurance premiums, aircraft repair costs, disruption-related liabilities, runway damage, and airstrip maintenance. In military contexts, the system 100 may provide continuity of operations by preserving high-value aerial assets under combat or degraded landing conditions.

Moreover, the emergency aircraft landing system 100 presents an economically beneficial alternative to permanent arresting gear and reinforced runway infrastructure, particularly in mobile and temporary deployment environments. The design of the system 100 as detailed in FIGS. 1-3 permits centralized procurement and decentralized utilization across multiple airfields without the need for fixed installation. The preservation of aircraft hull integrity and avoidance of runway surface damage offer substantial long-term cost efficiencies to both operators and facility owners. Collectively, the system 100 offers a high-reliability, low-dependency solution that improves aircraft survivability, operational readiness, and safety outcomes in critical landing gear malfunction scenarios.

Numerous modifications and variations of the present disclosure are possible in light of the above teachings. It is therefore to be understood that within the scope of the appended claims, the invention may be practiced otherwise than as specifically described herein.

The invention claimed is:

1. An emergency aircraft landing system, comprising:
   a mobile platform having a flat top surface configured to receive an aircraft landing without deployed landing gear,
   a plurality of wheels connected to the mobile platform by a plurality of axles mounted to a frame of the mobile platform,
   a propulsion system secured to the frame of the mobile platform configured to accelerate the mobile platform to a speed, wherein the propulsion system is mounted to the frame of the mobile platform without extending above the flat top surface of the mobile platform, and
   a securing mechanism configured to activate upon contact with the aircraft and secure the aircraft to the mobile platform during deceleration,
   wherein the mobile platform has a long dimension x and a short dimension y, wherein the plurality of wheels have an axis of rotation parallel to the long dimension x.

2. The emergency aircraft landing system of claim 1, wherein the plurality of wheels comprises:
   tires having a circumferential groove tread pattern; and
   fusible plugs disposed on an inside of the wheels, configured to melt at a predetermined temperature to prevent wheel explosion.

3. The emergency aircraft landing system of claim 1, wherein the securing mechanism comprises:
   a magnetic or clamping system configured to be activated during a landing, and
   a plurality of hydraulically extendable projections.

4. The emergency aircraft landing system of claim 3, wherein the magnetic or clamping system comprises electromagnets that are automatically energized upon a detected contact of the aircraft on the mobile platform.

5. The emergency aircraft landing system of claim 1, further comprising:
   one or more guidance sensors arranged in a linear array along a longitudinal center and perimeter of the flat top surface of the mobile platform, wherein the guidance sensors include at least one of: a radar sensor, an optical alignment marker, a laser position indicator, a LIDAR sensor, an infrared sensor, and a radio frequency identification (RFID) marker,
   wherein the guidance sensors are:
   physically mounted on recessed brackets secured to the top surface of the mobile platform,
   electrically connected to a central control unit via shielded wiring harnesses embedded within the mobile platform; and
   configured to transmit positional data to guide the emergency aircraft landing system during landing.

6. The emergency aircraft landing system of claim 1, further comprising:

a compressed gas fire suppression system having one or more suppression storage tanks disposed beneath the mobile platform.

7. The emergency aircraft landing system of claim 1, wherein the plurality of axles supports differential steering control through independent torque modulation or braking on a left wheel bank and a right wheel bank, allowing the mobile platform to execute a controlled directional adjustment during aircraft alignment.

8. The emergency aircraft landing system of claim 1, further comprising:
a central control unit comprising a processor configured to execute an instruction set to interpret data from a guidance sensor, assess the aircraft descent pattern, and generate a control signal for actuating the propulsion system and securing mechanism during a landing operation.

9. The emergency aircraft landing system of claim 1, further comprising:
a communication interface configured to exchange real-time positional and speed data between the mobile platform and the aircraft to facilitate synchronized movement during landing.

10. An emergency aircraft landing system, comprising:
a mobile platform having a flat top surface configured to receive an aircraft landing without deployed landing gear,
a plurality of wheels connected to the mobile platform by a plurality of axles mounted to a frame of the mobile platform,
a propulsion system secured to the frame of the mobile platform configured to accelerate the mobile platform to a speed, wherein the propulsion system is mounted to the frame of the mobile platform without extending above the flat top surface of the mobile platform, and
a securing mechanism configured to activate upon contact with the aircraft and secure the aircraft to the mobile platform during deceleration,
wherein the propulsion system comprises:
at least one jet engine.

11. An emergency aircraft landing system, comprising:
a mobile platform having a flat top surface configured to receive an aircraft landing without deployed landing gear,
a plurality of wheels connected to the mobile platform by a plurality of axles mounted to a frame of the mobile platform,
a propulsion system secured to the frame of the mobile platform configured to accelerate the mobile platform to a speed, wherein the propulsion system is mounted to the frame of the mobile platform without extending above the flat top surface of the mobile platform,
a securing mechanism configured to activate upon contact with the aircraft and secure the aircraft to the mobile platform during deceleration, and
a suspension system secured to the frame of the mobile platform, wherein the suspension system comprises a plurality of multi-stage shock absorbers, configured to reduce impact loads during a landing.

12. A method for emergency landing of an aircraft experiencing landing gear malfunction, the method comprising:
positioning the mobile platform of claim 1 at a position on a runway,
accelerating the mobile platform to a speed,
receiving the aircraft on the flat top surface of the mobile platform at the speed,
activating the securing mechanism to affix the aircraft to the mobile platform; and
decelerating the combined mobile platform and aircraft.

13. The method of claim 12 further comprising:
communicating speed and position data between the mobile platform and the aircraft to facilitate synchronized movement during landing.

14. The method of claim 12, wherein the aircraft lands on the moving mobile platform in an inelastic collision, and the combined aircraft and mobile platform are gradually decelerated.

15. The method of claim 12, wherein activating the securing mechanism comprises:
engaging a magnetic or clamping system to create an initial bond between the aircraft and the mobile platform,
activating mechanical clamps to provide secondary securing of the aircraft; and
extending a plurality of hydraulically extendable projections.

16. The method of claim 12, further comprising:
maintaining an aircraft's landing gear in a retracted position during the landing; wherein the landing gear in the retracted position is configured to reduce a risk of friction induced fires during emergency landing and minimize potential structural damage that leads to passenger injury.

* * * * *